June 18, 1968     L. D. PATRICK     3,388,689

ADJUSTABLE MILKING CLAW SUPPORT FOR TEAT CUPS

Filed July 19, 1966     2 Sheets-Sheet 1

Lewis D. Patrick
INVENTOR

BY James F. Weiler
Jefferson D. Giller
William A. Stout
Paul L. DeVerter
Dudley R. Dobie, Jr.
ATTORNEY June 18, 1968           L. D. PATRICK           3,388,689
ADJUSTABLE MILKING CLAW SUPPORT FOR TEAT CUPS
Filed July 19, 1966           2 Sheets-Sheet 2
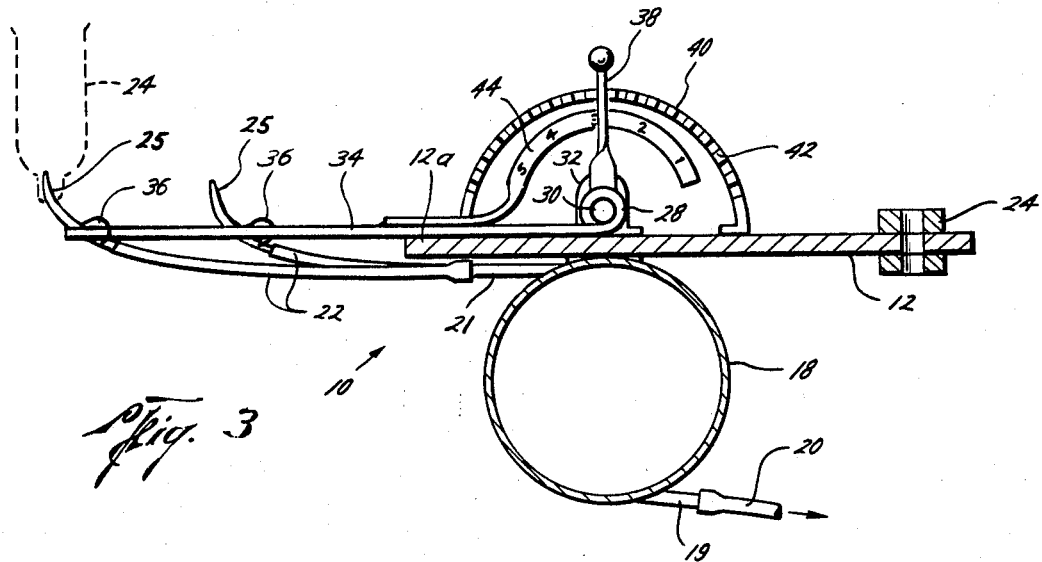
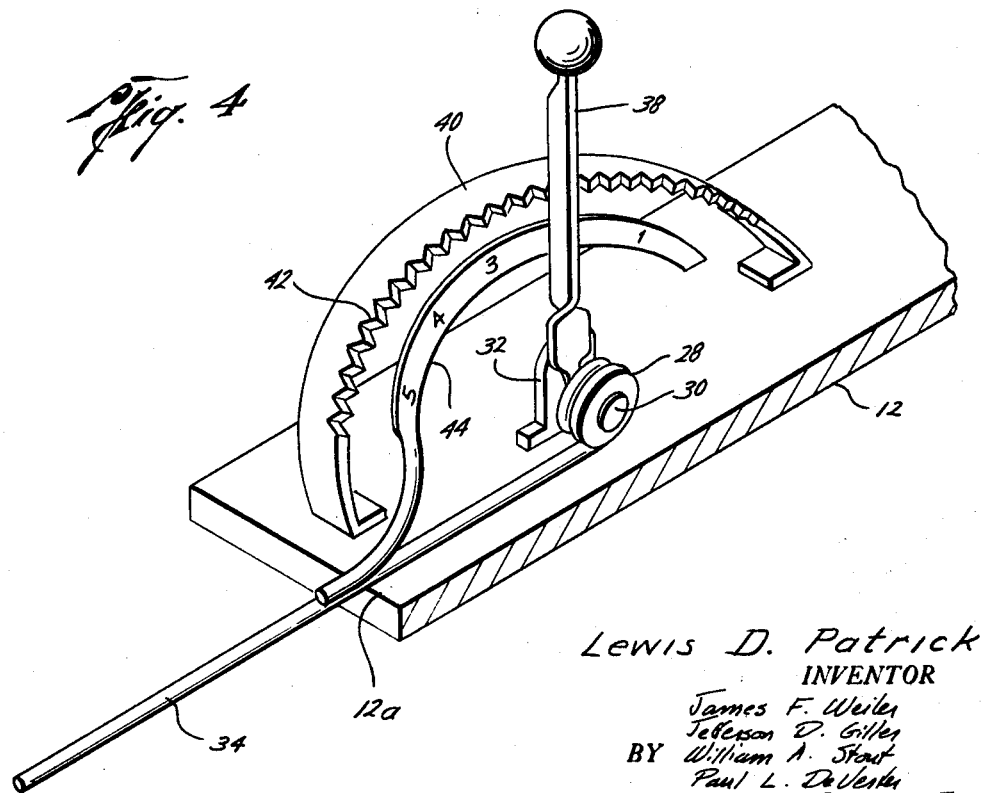
Lewis D. Patrick
INVENTOR
BY James F. Weiler
Jefferson D. Giller
William A. Stout
Paul L. DeVerter
Dudley R. Dobie, Jr.
ATTORNEY 3,388,689
ADJUSTABLE MILKING CLAW SUPPORT
FOR TEAT CUPS
Lewis D. Patrick, Rte. 1, Box 165,
Pleasant Hill, La. 71065
Filed July 19, 1966, Ser. No. 566,338
10 Claims. (Cl. 119—14.13)

The present invention relates to an improved method and milking claw apparatus for vacuum milking of dairy animals and more particularly to an improved milking claw for use with cups adaptable to the teats of an udder whereby the milking claw is adjustable for varying tension to each quarter of the udder to yieldably urge each cup away from the individual teats subsequent to substantial drainage of milk from the udder to prevent injury thereto.

In dairy operations, the milking of cows generally is carried out through the use of cups mounted on a cow's teats with flexible tubes leading to a reservoir. Usually disposed within the cups are resilient inflation membranes that periodically expand whereby milk is drained from the teats through application of a vacuum. Milk is thus forced from the cow's udder and flows through the flexible tubes to the reservoir. Upon substantial drainage of milk from the udder, the teats tend to contract and unless an operator is present to remove the cups after the milking operation is complete, the cups will remain on the teats because of the vacuum. In this circumstance, the usual result is that the cups "crawl up" or otherwise contact the udder and bruise it. The cow must then be taken out of service because of the injury and production is lost.

Another problem encountered in milking operations is the variety in length, spacing and angle of projection of teats of cows in dairy herds. Such variety makes difficult the use of standard milking claws commonly used in large scale dairy operations.

It would be highly advantageous to provide a method and means to counter-balance the effect of the vacuum bondage of the cups to the teats of an udder whereby the cups may be removed from the teats upon substantial drainage of milk from the udder. It would be advantageous also to provide such method and means which are readily adaptable to individual teats of a cow regardless of the length, spacing and angle of projection of the teats. The present invention is directed to such a method and device through the provision of an improved adjustable milking claw whereby injury to the udder is eliminated while at the same time facilitating a dairy milking operation by automatic removal of cups from the teats when the milking of a cow is complete.

It is, therefore, an object of the present invention to provide a method and apparatus attaining the foregoing advantages, and particularly a method and apparatus for increased ease of operation, milking efficiency and increased dairy production.

A further object of the present invention is to provide an improved milking claw apparatus for vacuum operation with cups adaptable to the teats of an udder whereby through individual quarter tension adjustment the cups are yieldingly urged away from each teat subsequent to substantial drainage of milk from the udder.

Another object of the present invention is to provide an improved method for milking by vacuum drainage of milk from an udder by maintaining yieldable tension on cups attached to the teats thereof whereby upon substantial drainage of milk from the udder, the tension overcomes force of the vacuum to withdraw the cups from the teats.

A still further object of the present invention is to provide an adjustable milking claw device wherein the teat cups are prevented from contacting the ground after removal from the teats of an udder upon completion of the milking operation.

Still another object of the present invention is to provide an improved milking claw device having means to urge cups away from the teats of an udder subsequent to substantial drainage of milk therefrom wherein said means as adjustable quarter tension settings to accommodate cows having varying teat orientations and sizes of teat orifices.

Yet a further object of this invention is the provision of an improved adjustable milking claw apparatus for vacuum operation with cups adaptable to the teats of an udder comprising a support, a reservoir tank, flexible tubing for fluid communication between the teat cups and the tank, and adjustable spring means mounted on the support for coaction with the tubing whereby the tubing and the cups are yieldingly urged away from the teats upon substantial drainage of milk therefrom.

Other and further objects, features and advantages will be apparent from the following description of a presently preferred embodiment of the invention given for the purpose of disclosure, taken in conjunction with the accompanying drawings where like character references designate like parts throughout the several views and where:

FIGURE 3 is a partial side view partially in section taken along the line 3—3 of FIGURE 2 of the present invention, and FIGURE 4 is a partial perspective view partially in section taken along the line 4—4 of FIGURE 2 of the present invention.

The device of the present invention generally comprises a support having a reservoir tank for milk secured thereto with an outlet for milk drainage to a vacuum system and an inlet for connection to flexible tubing in fluid communication with cups adaptable to the teats of an udder. Secured to the support are a plurality of adjustable helical spring arrangements to yieldingly urge the cups away from individual teats upon substantial drainage of milk therefrom.

Figure 1:
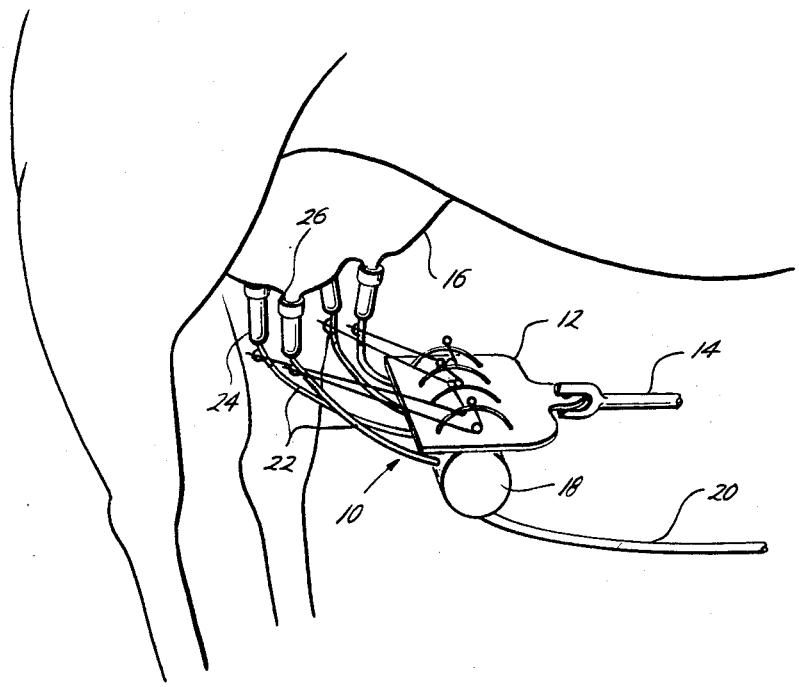
FIGURE 1 is a partial perspective of the present invention in operation.

Referring now to the drawings and particularly to FIGURE 1, the reference numeral 10 generally refers to the improved milking claw apparatus of the present invention. The milking claw comprises a base or support member 12 adjustably connected to a "randle" or supporting arm 14 for positioning beneath the udder 16 of a cow. Secured to the support member 12 is a milk reservoir tank 18 to which is attached a milk outlet line 20. The outlet line 20 communicates with a conventional vacuum milking system as is well known in the art. Also connected to the reservoir tank 18 are flexible tubes 22 in fluid communication with cups 24 adaptable for mounting on the teats 26 of the udder 16.

With reference to FIGURE 3, the milking claw device 10 is shown in more detail. Provided at one end of the support member 12 is a sleeve 24 secured thereto for pivotal engagement with the support arm 14 as shown in FIGURE 1. The milk reservoir tank 18 is provided at its lower extremity with an outlet pipe 19 to which the tubing 20 is coupled for connection to a vacuum system for draw-off of milk. At the upper extremity of the tank 18 is at least one inlet pipe 21 to which the flexible tubes 22 are attached. Nipples 25 adapt the tubes 22 to receive the teat cups 24.

Figure 2:
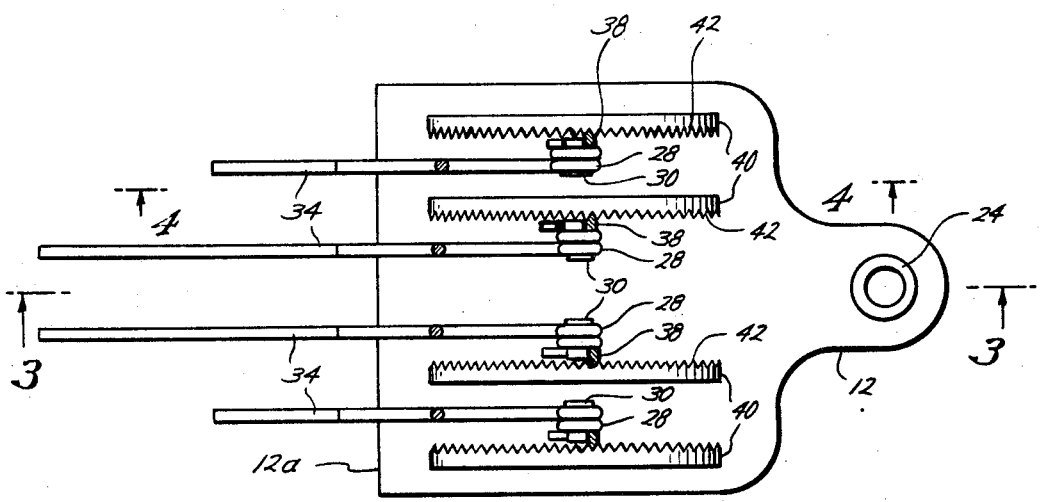
FIGURE 2 is a partial plan view showing the improved milking claw of the present invention.

Referring now to both FIGURES 2 and 3, helical springs 28 are each pivotally secured to the support member 12 by an axial pin 30 and pin mounting post 32. Each helical spring 28 has an elongate first end 34 to slidably engage the flexible tubes 22 by means of a suitable clip 36 secured to the nipple 25. The second end of each helical spring 28 forms a dog 38. Adjacent to each dog 38 and engageable therewith is an arcuate plate 40 having a plurality of notches or teeth 42 as shown. Each arcuate plate 40 is secured as by welding to the support member 12 for rigidity.

Although it is preferred that there be a set of four individual helical spring and arcuate plate arrangements, only one such individual combination will be discussed by reference to FIGURE 4. Thus the dog 38 is shown in engagement with a particular notch 42 of the arcuate plate 40. Secured to the elongate end 34 of the helical spring 28 is a tension indicating bar 44 having a numerical tension scale as shown. With the dog end 38 of the helical spring 28 in engagement with a particular notch 42 of the arcuate plate 40, the helical spring 28 has only its elongate end 34 free for movement. The elongate end 34 can be moved upward to create tension in the spring 28 and can also be moved laterally to some extent to allow for adjustment during milking operation as will be explained.

In operation, the milking claw apparatus of the present invention is placed beneath the udder of a cow by proper positioning with the support arm 14 as shown in FIGURE 1. The cups 24 in fluid communication with the reservoir tank 18 by the flexible tubes 22 are placed on each individual teat 26 of the udder 16 and proper downward tension is applied simultaneously by the present invention to each cup 24 individually. At the same time the vacuum system is placed in operation and vacuum is transmitted to the cups 24 by means of the tubing 20 connected to the reservoir tank 18. Milking of the udder is thus begun.

In order to remove the cups 24 from the teats 26 after substantially all of the milk is drained from the udder, the dog 38 of each helical coil 28 as shown in FIGURES 3 and 4 is positioned within a predetermined notch 42 of the arcuate plate 40. For example, if the cow being milked is a "hard milking" cow, i.e. one having small orifices in its teats, a substantial vacuum will build up within the cups 24 since the milk does not flow freely from the udder 16. Thus, upon completion of the milking operation, greater force than normal will be required to pull the cups 24 away from the teats 26. In such a case, the dog 38 is set in a notch, for example, adjacent the "5" setting on the indicator 44. Since the support member 12 is longitudinally disposed as shown in the drawings, the elongate arm 34 of the helical spring 28 rests on the support member. It thus becomes apparent that tension, stress, or tensile stress is now present in the helical spring 28. With such tension in the spring, the support member 12 is then moved down or toward the rear of the cow such that the sliding engagement of the elongate arm 34 with the flexible tubes 22 by means of the clips 36 tends to pull each arm 34 upward thereby increasing stress or tension in the coil spring 28.

The elongate arms 34 are then pulled upward enough so that there is clearance between each arm and the edge 12a of the support member 12. At this point in the operation, the cups 24 must remain bonded by vacuum to the teats 26 for the milking operation and should not be pulled therefrom by stress in the helical spring 28 and the elongate arm 34 thereof. However, when milk is substantially drained from the udder 16, air will begin to pass through a cup 24 so that there is a slight reduction in cleavage of the particular cup 24 to the teat 26. Upon such reduction in cleavage, the tension of the elongate arm 34 of the helical spring 28 will cause the elongate arm 34 to move downward until limited by the extension or edge 12a of the support member 12. Such downward movement causes the cup 24 in question to drop from the teat 26 and each cup 24 will eventually do likewise.

Since the elongate arms 34 are restricted from further downward movement by the edge 12a of the support member 12, the cups 24 fall only a short distance and are thus prevented from contacting the floor. A cleaner milking operation is thereby promoted.

If the particular cow being milked is not a "hard milking" cow, but is one having relatively large orifices in its teats 26, the vacuum system will not exert as much negative pressure through the cups 24 and less force is required to pull each cup from the teats upon substantial drainage of milk from the udder. In such case, each dog 38 should be placed in a notch 40 adjacent a lower number on the indicator 44 whereby less tension is placed on the elongate arm 34 by the helical spring 28.

It is preferred that each elongate arm 34 be formed of generally the same material of construction as the helical spring 28 to allow for some flexibility. Such flexibility thus permits the arm 34 to undergo lateral movement to adjust for a range of orientation spacing of teats 26 of different cows. Thus the present invention can be used with a cow having widely spaced teats as shown in FIGURE 1 as well as one having them more narrowly spaced.

Thus provided is a new and unique milking claw for yieldably urging vacuum cups from the teats of an udder upon substantial drainage of milk therefrom to prevent injury to the udder. Further provided is a novel method for milking through the use of yieldable tension on a teat cup whereby subsequent to substantial drainage of milk from the udder and upon passage of air into the cup, the tension overcomes force of the vacuum to withdraw the cup from the teat.

The present invention, therefore, is well adapted to carry out the objects and attain the ends and advantages mentioned as well as others inherent therein. While a presently preferred embodiment of the invention has been given for the purpose of disclosure, numerous changes in the detail of construction and combination, shape, size and arrangement of parts may be resorted to without departing from the spirit and scope of the invention as hereinafter claimed.

What is claimed is:

1. An improved adjustable milking claw apparatus for vacuum operation with cups adaptable to the teats of an udder, including,
   a support member,
   a reservoir tank secured to said support member and having inlet and outlet means,
   at least one tubing member for fluid communication between a teat cup and the tank, and
   spring means mounted on the support member secured on said tubing member adjacent the teat cup and constituting a means for yieldingly urging the cup downwardly away from the teats subsequent to substantial drainage of milk therefrom.

2. The invention of claim 1 wherein the spring means mounted on the support member for coaction with the tubing member includes,
   a helical spring secured to the support member for axial pivoting and having two ends extending laterally of the spring, the first end slidably engaging the tubular member,
   a dog integrally formed of the second end of the helical spring, and
   notch means secured to the support member for coaction with the dog whereby selective positioning of the dog therewith varies tension of the first end of the helical spring.

3. The invention of claim 2 including additionally means for indicating tension between the dog and first end of the helical spring.

4. The invention of claim 2 wherein the support member is longitudinally disposed to restrict vertical movement of the first end of the helical spring.

5. The invention of claim 2 including additionally means for indicating tension between the dog and the first end of the helical spring and wherein the support member is longitudinally disposed to restrict vertical movement of the first end of the helical spring.

6. In an improved adjustable quarter milking claw apparatus for vacuum operation with cups adaptable to the teats of an udder, the combination with a support member and a reservoir tank secured thereto having inlet and outlet means, of the improvement comprising,
- at least one tubing member for fluid communication between a teat cup and the tank, and
- spring means mounted on the support member secured on said tubing member adjacent the teat cup and constituting a means for yieldingly urging the cup downwardly away from the teat upon substantial drainage of milk therefrom.

7. The invention of claim 6 wherein the spring means mounted on the support member for coaction with the tubing member includes,
- a helical spring secured to the support member for axial pivoting and having two ends extending laterally of the spring, the first end slidably engaging the tubular member,
- a dog integrally formed of the second end of the helical spring, and
- notch means secured to the support member for coaction with the dog whereby selective positioning of the dog therewith varies tension of the first end of the helical spring.

8. The invention of claim 7 including additionally means for indicating tension between the dog and first end of the helical spring.

9. The invention of claim 7 wherein the support member is longitudinally disposed to restrict vertical movement of the first end of the helical spring 10. The invention of claim 7 including additionally means for indicating tension between the dog and first end of the helical spring and wherein the support member is longitudinally disposed to restrict vertical movement of the first end of the helical spring.

References Cited

UNITED STATES PATENTS

| | | | |
|---|---|---|---|
| 798,608 | 9/1905 | Hoover | 119—14.18 |
| 1,301,992 | 4/1919 | Anderson | 119—14.54 |
| 2,136,228 | 11/1938 | Babson et al. | 119—14.13 |
| 2,613,636 | 10/1952 | Babson | 119—14.13 |
| 2,747,544 | 5/1956 | Thomas | 119—14.13 |
| 2,775,224 | 12/1956 | Rawson et al. | 119—14.13 |
| 2,935,042 | 5/1960 | Sprague | 119—14.45 |
| 3,033,161 | 5/1962 | Babson | 119—14.45 X |
| 3,079,891 | 3/1963 | Miller | 119—14.50 |
| 3,094,099 | 6/1963 | Bertao | 119—14.54 |

FOREIGN PATENTS

| | | |
|---|---|---|
| 1,057,630 | 10/1953 | France. |
| 1,257,532 | 2/1961 | France. |

ALDRICH F. MEDBERY, *Primary Examiner.*